US010820155B2

United States Patent
Seo et al.

(10) Patent No.: US 10,820,155 B2
(45) Date of Patent: Oct. 27, 2020

(54) METHOD AND DEVICE FOR POSITION-BASED SERVICE

(71) Applicant: SAMSUNG ELECTRONICS CO., LTD., Suwon-si (KR)

(72) Inventors: Sin-Seok Seo, Seongnam-si (KR); Do-Jun Byun, Seoul (KR); Sung-Wook Won, Seoul (KR); Ki-Seok Lee, Yongin-si (KR); Do-Hy Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/753,862

(22) PCT Filed: Aug. 31, 2016

(86) PCT No.: PCT/KR2016/009702
§ 371 (c)(1),
(2) Date: Feb. 20, 2018

(87) PCT Pub. No.: WO2017/039303
PCT Pub. Date: Mar. 9, 2017

(65) Prior Publication Data
US 2018/0262870 A1 Sep. 13, 2018

(30) Foreign Application Priority Data
Aug. 31, 2015 (KR) .................. 10-2015-0123038

(51) Int. Cl.
*H04W 4/021* (2018.01)
*H04W 4/029* (2018.01)
(Continued)

(52) U.S. Cl.
CPC ........... *H04W 4/029* (2018.02); *H04W 4/021* (2013.01); *H04W 12/0804* (2019.01); *H04W 88/02* (2013.01); *H04W 88/18* (2013.01)

(58) Field of Classification Search
None
See application file for complete search history.

(56) References Cited

U.S. PATENT DOCUMENTS

| 8,265,051 B2 | 9/2012 | Kwak |
| 2009/0201850 A1 | 8/2009 | Davis et al. |

(Continued)

FOREIGN PATENT DOCUMENTS

| EP | 2 750 418 A1 | 7/2014 |
| EP | 2 806 597 A2 | 11/2014 |

(Continued)

OTHER PUBLICATIONS

Search Report dated Nov. 28, 2016, issued by the International Searching Authority in counterpart International Patent Application No. PCT/KR2016/009702 (PCT/ISA/210).

(Continued)

*Primary Examiner* — Mazda Sabouri
(74) *Attorney, Agent, or Firm* — Sughrue Mion, PLLC

(57) ABSTRACT

The present disclosure relates to technology for a sensor network, machine to machine (M2M) communication, machine type communication (MTC), and the Internet of Things (IoT). The present disclosure can be utilized in intelligent services (such as smart home, smart building, smart city, smart car or connected car, healthcare, digital education, retail business, security and safety-related services) based on the technology. The present disclosure relates to a method for a terminal for a position-based service, comprising the steps of: detecting a first signal related to a position of the position-based service in a first (Continued)

mode of scanning the first signal; and determining whether to switch to a second mode of transmitting a second signal related to a position of the terminal according to second mode related information included in the first signal.

12 Claims, 7 Drawing Sheets

(51) Int. Cl.
  *H04W 88/02* (2009.01)
  *H04W 88/18* (2009.01)
  *H04W 12/08* (2009.01)

(56) References Cited

U.S. PATENT DOCUMENTS

| | | | |
|---|---|---|---|
| 2010/0056124 A1* | 3/2010 | Keating | H04W 4/02 455/418 |
| 2011/0117902 A1* | 5/2011 | Chang | H04W 4/02 455/418 |
| 2012/0157117 A1 | 6/2012 | Choi et al. | |
| 2012/0314587 A1* | 12/2012 | Curticapean | G01S 5/0257 370/252 |
| 2013/0229923 A1 | 9/2013 | Salomone et al. | |
| 2014/0204891 A1 | 7/2014 | Park et al. | |
| 2014/0242966 A1* | 8/2014 | Keating | H04W 48/04 455/418 |
| 2015/0181507 A1 | 6/2015 | Park et al. | |
| 2015/0237193 A1* | 8/2015 | Zeilingold | H04M 1/72572 455/418 |
| 2016/0330675 A1* | 11/2016 | Reitsma | H04W 48/16 |
| 2017/0324578 A1 | 11/2017 | Kang et al. | |
| 2017/0366926 A1* | 12/2017 | Ray | G06Q 30/0201 |

FOREIGN PATENT DOCUMENTS

| | | |
|---|---|---|
| KR | 10-2014-0143083 A | 12/2014 |
| KR | 10-2015-0022787 A | 3/2015 |
| KR | 10-2016-0057958 A | 5/2016 |
| WO | 2011/021782 A2 | 2/2011 |
| WO | 2011/066464 A2 | 6/2011 |
| WO | 2013/022254 A2 | 2/2013 |

OTHER PUBLICATIONS

Written Opinion dated Nov. 28, 2016, issued by the International Searching Authority in counterpart International Patent Application No. PCT/KR2016/009702 (PCT/ISA/237).
Communication dated May 18, 2018, issued by the European Patent Office in counterpart European Patent Application No. 16842269.9.

* cited by examiner

METHOD AND DEVICE FOR POSITION-BASED SERVICE

This application is a National Phase Entry of PCT International Application No. PCT/KR2016/009702, which was filed on Aug. 31, 2016, and claims a priority to Korean Patent Application No. 10-2015-0123038, which was filed on Aug. 31, 2015, the contents of which are incorporated herein by reference.

TECHNICAL FIELD

The present disclosure relates to a method and apparatus for providing a location-based service.

BACKGROUND ART

Internet, which is a human-oriented connectivity network where humans generate and consume information, is now evolving to the Internet of Things (IoT) where distributed entities, such as things, exchange and process information. The Internet of Everything (IoE) has also emerged, which is a combination of the IoT technology and the Big Data processing technology through connection with a cloud server.

As technology elements, such as sensing technology, wired/wireless communication and network infrastructure, service interface technology, and security technology, have been demanded for IoT implementation, a sensor network, a machine to machine (M2M), machine type communication (MTC), and so forth have been recently researched for connection between things.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances, advanced medical services, and so forth through convergence and combination between existing IT and various industries.

One of representative services currently used for IoT implementation, a location-based service provides a short-range service on the basis of a beacon signal. As user demands for the short-range service are increasing, a need exists for a detailed scheme for using a beacon signal to meet the user demands.

DETAILED DESCRIPTION OF THE INVENTION

Technical Problem

The present disclosure relates to a method and apparatus for providing various location-based services to users on the basis of a beacon technology.

Technical Solution

A method of a user equipment (UE) for a location-based service according to an embodiment of the present disclosure includes detecting a first signal related to a location of the location-based service in a first mode for scanning the first signal and determining whether to switch to a second mode for transmitting a second signal related to a location of the UE based on second mode-related information included in the first signal.

A method of a device for a location-based service according to an embodiment of the present disclosure includes transmitting information related to a second mode through a first signal related to a location of a location-based service and exchanging additional information for the second mode with a UE having received the first signal, in which the second mode is a mode in which the UE transmits a second signal related to a location of the UE.

A method for a server for a location-based service according to an embodiment of the present disclosure includes providing information related to the location-based service, which corresponds to a first signal related to a location of the location-based service, to a UE if receiving a notification indicating that the first signal is detected from the UE, and exchanging additional information, needed for switch to a second mode in which the UE transmits a second signal related to a location of the UE, with the UE, if the first signal comprises information related to the second mode.

A method for a device for a location-based service according to an embodiment of the present disclosure includes receiving a second device related to a location of a UE from the UE and transmitting the second signal to a server or a 3rd-party service providing device which provides a service related to the location of the UE.

A UE for receiving a location-based service according to an embodiment of the present disclosure includes a transceiver configured to detect a first signal related to a location of the location-based service in a first mode for scanning the first signal and a controller configured to determine whether to switch to a second mode for transmitting a second signal related to a location of the UE based on second mode-related information included in the first signal.

A device for a location-based service according to an embodiment of the present disclosure includes a controller configured to control a transceiver to transmit information related to a second mode through a first signal related to a location of a location-based service and the transceiver configured to exchange additional information for the second mode with a UE having received the first signal, in which the second mode is a mode in which the UE transmits a second signal related to a location of the UE.

A server for a location-based service according to an embodiment of the present disclosure includes a controller configured to control a transceiver to provide information related to the location-based service, which corresponds to a first signal related to a location of the location-based service, to a UE if receiving a notification indicating that the first signal is detected from the UE, and the transceiver configured to exchange additional information, needed for switch to a second mode in which the UE transmits a second signal related to a location of the UE, with the UE, if the first signal comprises information related to the second mode.

A device for a location-based service according to an embodiment of the present disclosure includes a transceiver configured to receive a second device related to a location of a UE from the UE and a controller configured to control the transceiver to transmit the second signal to a server or a 3rd-party service providing device which provides a service related to the location of the UE, upon sensing reception of the second signal through the transceiver.

Advantageous Effects

When a short-range service based on a hybrid beacon scheme according to an embodiment of the present disclosure is provided, various services may be provided with one application without needing to install a separate application for each service by overcoming shortcomings of a forward beacon scheme, and even when the number of nearby beacon devices increases, electric current consumption is not increased, and a service may also be provided through a nearby object without intervention of a UE. Moreover, a beacon signal transmission period is changed corresponding to a service type, thereby adjusting a service reaction speed and thus reducing electric current consumption.

Furthermore, when the short-range service based on the hybrid beacon scheme according to an embodiment of the present disclosure is provided, shortcomings of a backward beacon scheme are overcome, such that user's consent to service providing is determined and thus a spam service undesired by the user may be filtered. In addition, by expanding a supportable coverage of a UE, which is the big issue of the existing backward beacon scheme, more types of UEs may be supported, the possibility of invading user privacy may be lowered, and the possibility of beacon signal congestion may also be reduced.

MODE FOR CARRYING OUT THE INVENTION

Figure 1:
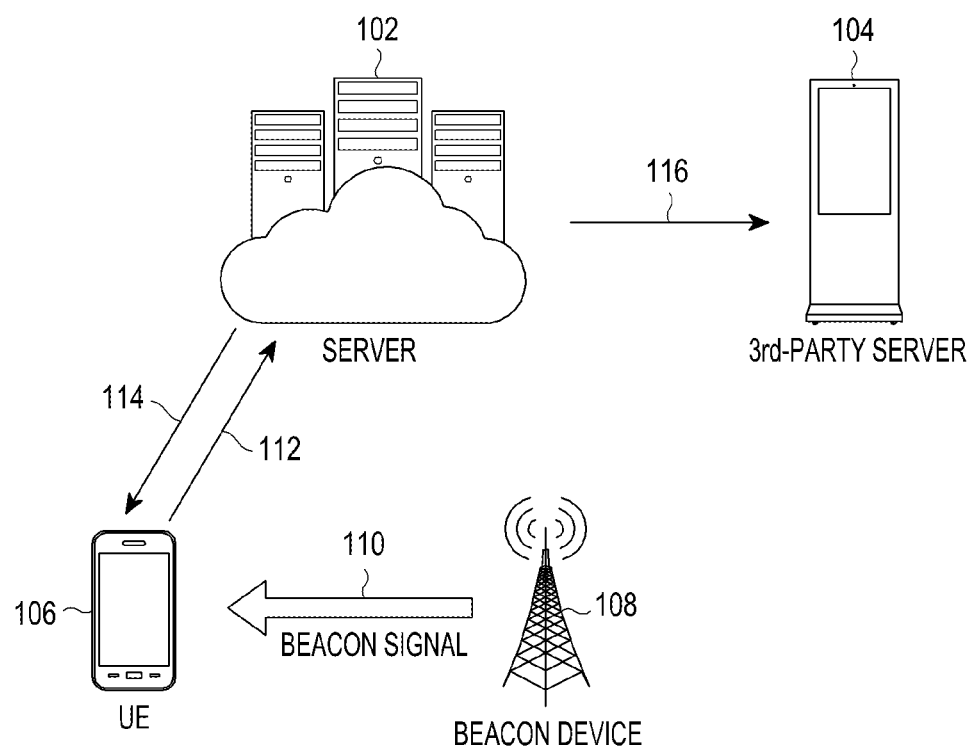
FIG. 1 is a view for describing an example of a general forward beacon scheme.

Hereinafter, the operating principles of exemplary embodiments of the present disclosure will be described with reference to the accompanying drawings. Like components are referred to as like reference numerals even through being illustrated in different drawings, and in the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

The present disclosure relates to a method and apparatus for providing a location-based service for a user equipment (UE) by using a beacon technology. The location-based service may include, for example, personalized advertisement, a coupon, an indoor navigation system, a lost child prevention bracelet, an escape route or measures for disaster occurrence, and the like.

Generally, the meaning of "advertise" may be defined as a technique for transmitting a signal to many unspecific targets. In wireless communication, advertisement is performed by frequently transmitting a beacon signal including a small amount of information (e.g., a location identifier) to unspecific targets. A process in which a device monitors reception of a beacon signal for advertisement to detect the beacon signal is defined as scanning. Herein, an advertising scheme will be described as a concept corresponding to transmission to unspecific targets.

Generally, a service using a beacon signal may be classified into a forward beacon scheme and a backward beacon scheme depending on a subject that performs advertisement.

FIG. 1 is a view for describing an example of a general forward beacon scheme.

Referring to FIG. 1, in a forward beacon scheme, it is assumed that a beacon device 108 generally installed in a fixed location advertises a beacon signal indicating location information about a location where the beacon device 108 is installed, and a mobile user equipment (UE), e.g. a UE 106 moves to a location where the UE 106 is able to receive the beacon signal advertised by the beacon device 108. Then, the UE 106 scans the beacon signal advertised by the beacon device 108 as indicated by 110. The UE 106 may be configured to interpret the scanned beacon signal and to perform a particular function or execute a corresponding application based on interpreted information. In this case, the UE 106 may perform the particular function or execute the corresponding application alone. Alternatively, in a process 112, the UE 106 notifies detection of the beacon signal to a server 102 which then recognizes that the particular function mapped to location information corresponding to the detected beacon signal is performed or the corresponding application is executed, and transmits related information to the UE 106. Herein, the related information may correspond to event or service information configured in a corresponding location. The server 102 communicating with the UE 106 recognizes that the UE 106 receives a particular beacon signal, i.e., the beacon signal of the beacon device 108 in the process 112, and provides a service mapped to a location corresponding to the beacon signal through processes 114 and 116. The server 102 stores location-related information about a location where a service is provided, e.g., location identifier information for each location-based service in a memory, and transmits a beacon signal corresponding to the stored location identifier information. In the process 114, the service corresponding to the beacon signal is directly provided to the UE 106 from the server 102. In this case, a representative example of the service corresponding to the beacon signal may include delivery of a discount coupon, sales information, a sales list, etc., provided in a store where the beacon device 108 is installed. In comparison, in the process 116, a service corresponding to the beacon signal corresponds to a $3^{rd}$-party service provided by a $3^{rd}$-party server 104, and the server 102 may deliver information indicating that the UE 106 receives the beacon signal to the $3^{rd}$-party server 104. A representative example of the service may be providing a user-tailored advertisement through digital signage.

Nearby beacon devices associated with various $3^{rd}$-party services advertise different beacon identifiers. However, in the forward beacon scheme as described with reference to FIG. 1, during initial use of a beacon service, a UE interprets only a beacon signal corresponding to a basic function or application provided by a UE manufacturer, that is, a location identifier. Thus, to interpret a beacon identifier related to various $3^{rd}$-party services, applications capable of interpreting a beacon signal have to be separately installed in a UE. Therefore, a UE where a corresponding application is not installed may not be able to use a corresponding beacon service.

In the forward beacon scheme, as the number of beacon devices available around the UE is large, the UE may frequently use Internet connection and computational resources for performing a task corresponding to or executing an application corresponding to a received beacon signal. As a result, power consumption of the UE may increase.

Meanwhile, in the forward beacon scheme, the UE receives a beacon signal and is provided with a corresponding service, such that a medium through which the service is provided is limited to the UE. That is, to receive various and rich services through a device or an apparatus installed near the user by a $3^{rd}$-party service provider, beside the UE, the UE has to intervene.

Moreover, in the forward beacon scheme, to receive a service, the UE has to receive a beacon signal advertised nearby. According to a period of the beacon signal transmitted by a nearby beacon device, a reaction speed of a service is determined. Generally, since the beacon device used in the forward beacon scheme is provided with power from a battery, a transmission period of the beacon signal is relatively long. Thus, services in which a speed of reaction to service providing, e.g., indoor navigation, escape route and measures for disaster occurrence, a temporary event, and so forth, are not suitable for being provided using the forward beacon scheme.

To overcome such shortcomings of the forward beacon scheme, the backward beacon scheme has been proposed. In the backward beacon scheme, a UE transmits a beacon signal and a nearby device receives and processes the beacon signal. Herein, the beacon signal transmitted by the UE may include information for identifying the UE (or UE identification information). The UE identification information may be included in the beacon signal in a form to which encryption or anonymization is applied to protect user's privacy.

Figure 2:
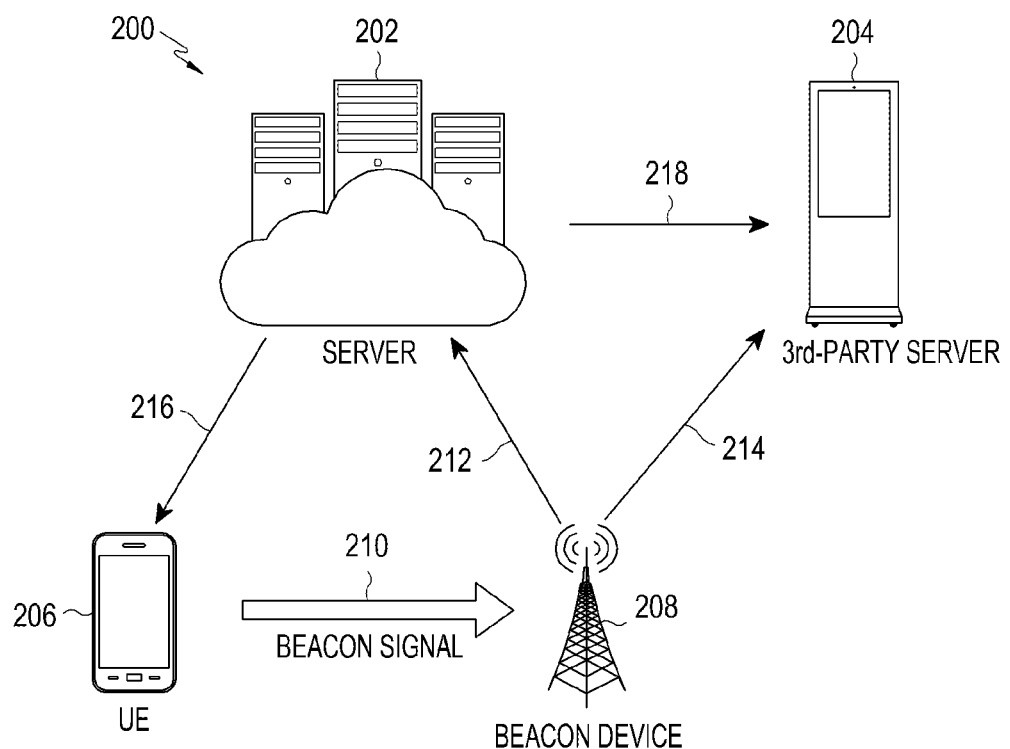
FIG. 2 is a view for describing an example of a general backward beacon scheme.

FIG. 2 is a view for describing an example of a general backward beacon scheme.

Referring to FIG. 2, in the backward beacon scheme, a UE having mobility advertises a beacon signal. For example, it is assumed that a UE 206 advertises a beacon signal as indicated by 210. It is also assumed that a beacon device 208 installed in a fixed position near the UE 206 scans the beacon signal. The beacon device 208 then interprets the scanned beacon signal and performs a specific task of the beacon device 208 based on the interpreted information, or delivers the interpreted information to a central server 202 to perform a more sophisticated task based on the interpreted information. If the interpreted information corresponds to a service having no need for intervention of the server 202, the beacon device 208 may deliver a signal directly to a service providing subject, e.g., a $3^{rd}$-party server 204 without passing through the server 202 in a process 214.

The server 202 having recognized that the UE 206 has transmitted the beacon signal in a process 212 provides a service corresponding to the beacon signal. If the service corresponding to the beacon signal is a service that may be provided directly to the UE 206, the server 202 provides the service to the UE 206 in a process 216. The service corresponding to the beacon signal may also be provided from a third device or nearby devices other than the server 202 and the beacon device 208. In FIG. 2, it is assumed that the service is provided to the UE 206 through the $3^{rd}$-party server 204. In this case, the service provided through the $3^{rd}$-party server 204 may be, for example, a user-tailored advertisement through a large format display (LFD), an auto lock release, etc.

By using the backward beacon scheme, when compared to the forward beacon scheme, a separate application does not need to be installed for each service, power consumption of a UE is small, and a nearby object may be a service providing medium without using the UE. The UE may also determine a transmission period of a beacon signal, such that the beacon signal may be frequently transmitted for a service to which a speed of reaction is important and the beacon signal may be less frequently transmitted for a service to which a speed of reaction is less important.

However, in the backward beacon scheme, the UE periodically transmits the beacon signal and a nearby device receives and reacts to the beacon signal or injects a service to the UE, such that it is important to obtain service providing consent in advance and thus a plurality of services not desired by a user may be provided as spam.

Moreover, most UEs implemented at present have a function of receiving a beacon signal at all times by default, but only some of them support a function of transmitting a beacon signal at all times, degrading general application of the backward beacon scheme when compared to the forward beacon scheme. Last, in the backward beacon scheme, since a UE transmits a beacon signal at all times, user privacy may be invaded by beacon signal analysis and an increasing number of UEs using the backward beacon scheme may increase the number of beacon signals, causing a congestion problem.

Therefore, a need exists for a scheme for providing various short-range services to users in a useful and convenient way by using the beacon technology.

Hereinafter, an embodiment of the present disclosure proposes a hybrid beacon scheme adopting both the forward beacon scheme and the backward beacon scheme based on the above-described pros and cons of the forward and backward beacon schemes. Beacon devices according to an embodiment of the present disclosure will be defined as below. First, a beacon device that transmits a beacon signal using the forward beacon scheme will be defined as an A-type beacon device, and the beacon signal transmitted by the A-type beacon device will be defined as an "A-type beacon signal". A beacon device that scans a beacon signal advertised by a UE using the backward beacon scheme will be defined as an S-type beacon device, and the beacon signal advertised by the UE will be defined as an "S-type beacon signal". The UE according to an embodiment of the present disclosure may operate in one of a scanning mode for scanning the A-type beacon signal and an advertising mode for advertising the S-type beacon signal.

Figure 3:
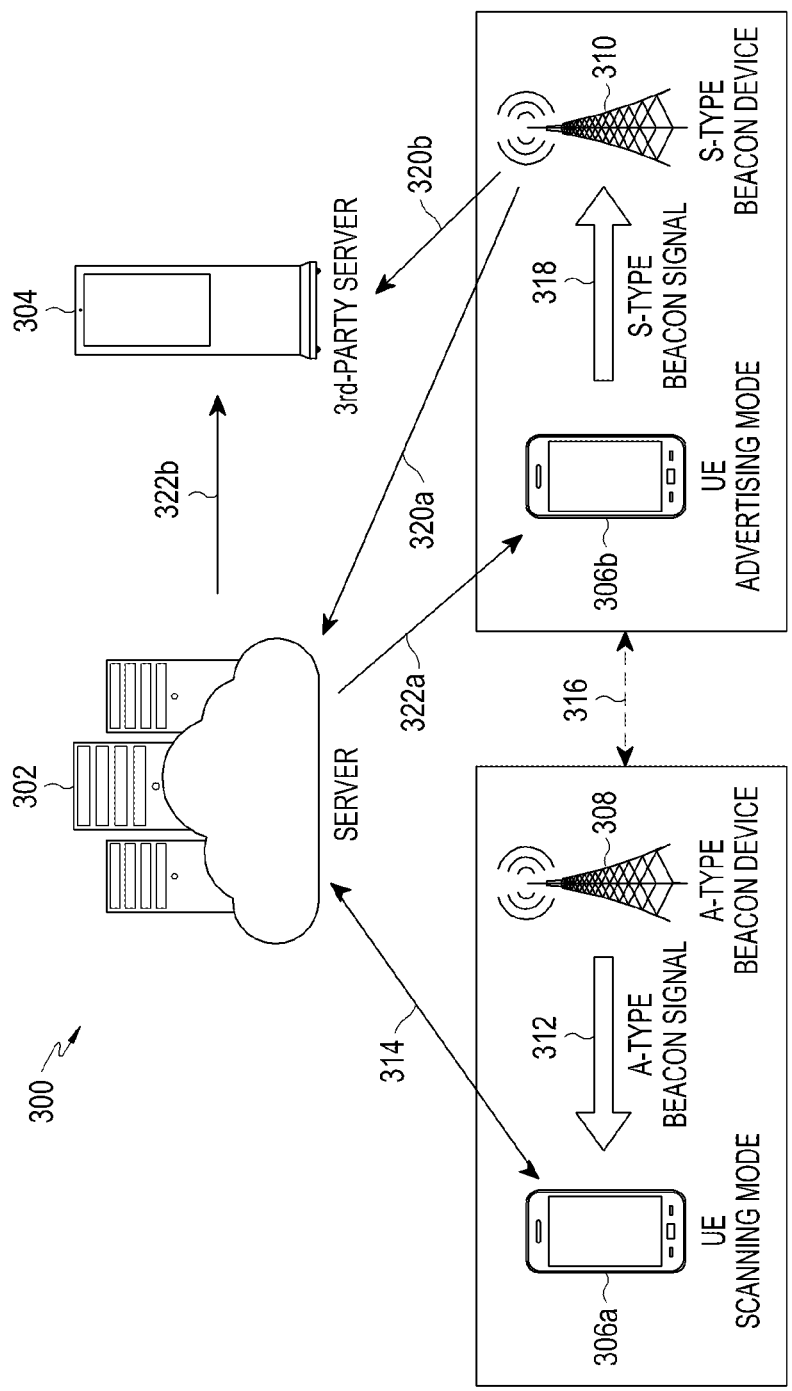
FIG. 3 shows an example of a communication system for providing a short-range service based on a hybrid beacon scheme according to an embodiment of the present disclosure.

FIG. 3 shows an example of a communication system for providing a short-range service based on a hybrid beacon scheme according to an embodiment of the present disclosure.

Referring to FIG. 3, a communication system 300 providing a short-range service may include, for example, UEs 306a and 306b, an A-type beacon device 308, an S-type beacon device 310, a server 302, and a $3^{rd}$-party server 304.

In operation 312, it is assumed that the A-type beacon device 308 periodically transmits a beacon signal and the UE 306a scans a nearby beacon signal. According to an embodiment of the present disclosure, a beacon signal advertised by the A-type beacon device 308 may be transmitted using, but not limited to, Bluetooth Low Energy (BLE), Wireless Fidelity (Wi-Fi), Audible Sound, Inaudible Sound, etc. The A-type beacon signal transmitted by the A-type beacon signal 308 according to an embodiment of the present disclosure may further include beacon service-related information and advertising mode-related information. For example, the beacon service-related information may include at least one of a beacon service type and information indicating whether to transmit a result of detecting the A-type beacon signal to a server. The advertising mode-related information may include at least one of information indicating whether to switch a UE having received the beacon signal to the advertising mode, parameters needed for switch of the UE to the advertising mode, a technology to be used for the advertising mode, and information indicating whether to receive additional information related to the advertising mode. The parameters needed for switch of the UE to the advertising mode may include an advertising period, an advertising signal strength, information to be included in an advertising signal, information indicating whether to perform scanning simultaneously with advertisement, etc. The technology to be used for the advertising mode may indicate one of BLE, Wi-Fi, and Audible/Inaudible Sound available in transmission of the A-type beacon signal.

The UE executes BLE scanning if the A-type beacon device 308 advertises a beacon signal by using BLE, executes Wi-Fi scanning if the A-type beacon device 308 advertises Wi-Fi, and executes ultrasound scanning using a microphone if the A-type beacon device 308 advertises an ultrasound-based beacon signal. Once a user moves near the A-type beacon device 308 while carrying the UE, e.g., the UE 306a, then the UE 306a scans the A-type beacon signal advertised from the A-type beacon device 308.

In this case, it is assumed that the A-type beacon device 308 advertises an ultrasound-based A-type beacon signal and the UE 306b switching to the advertising mode advertises a BLE-based beacon signal. The UE 306a having detected the A-type beacon signal transmitted based on ultrasound turns on a Bluetooth function therein. This operation may be applied in a flexible and hybrid manner depending on a type of a technology used in advertisement of a beacon signal.

If the A-type beacon signal received by the UE 306a provides the general forward beacon service, the UE 306a operates according to a general forward beacon service flow described with reference to FIG. 1.

On the other hand, if the A-type beacon signal received by the UE 306a includes information for switching the UE to the advertising mode, the UE 306a switches to the advertising mode in operation 316. According to an embodiment, before switching to the advertising mode, the UE 306a may check through communication with the server 304 if user's consent to a service to be currently provided in operation 314. During the communication with the server 304, the UE 306a may report to the server 302 that the UE 306a has detected the A-type beacon signal and thus may use the advertising mode-related information included in the A-type beacon signal when the service is provided in the advertising mode. For example, it is assumed that the detected A-type beacon signal includes information indicating reception of the additional information related to the advertising mode out of the advertising mode-related information through the server 302. The UE 306a then accesses the server 302 to receive the additional information related to the advertising mode. In this case, the additional information that the UE 306a may receive from the server 302 may include the parameters needed for switch of the UE to the advertising mode, the information indicating a technology to be used in the advertising mode, and so forth.

The UE 306b having switched to the advertising mode in operation 316 advertises the S-type beacon signal in operation 318. A period in which the UE 306b advertises the S-type beacon signal, an advertising signal strength, information included in the S-type beacon signal to be advertised, and so forth may vary with information obtained from the A-type beacon signal in operation 312 or information received from the server 302 in operation 314. In this case, the UE 306b is assumed to move near the S-type beacon device 310. Then, in operation 318, the S-type beacon signal 310 interprets an S-type beacon signal received from the UE 306b and provides a service corresponding to the interpreted beacon signal to the UE 306b. More specifically, the S-type beacon device 310 interprets the interpreted S-type beacon signal and delivers the same to the server 302 in operation 320a. For example, if the interpreted S-type beacon signal provides a local service, the UE 306b may directly deliver the local service to the $3^{rd}$-party server 304 providing the local service in operation 320b.

If the S-type beacon device 310 recognizes in operation 320a that the UE 306b has detected the S-type beacon signal, the server 302 directly provides the service to the UE 306b in operation 322a or delivers the service to the UE 306b through the $3^{rd}$-party server 304 in operation 322b.

Figure 4:
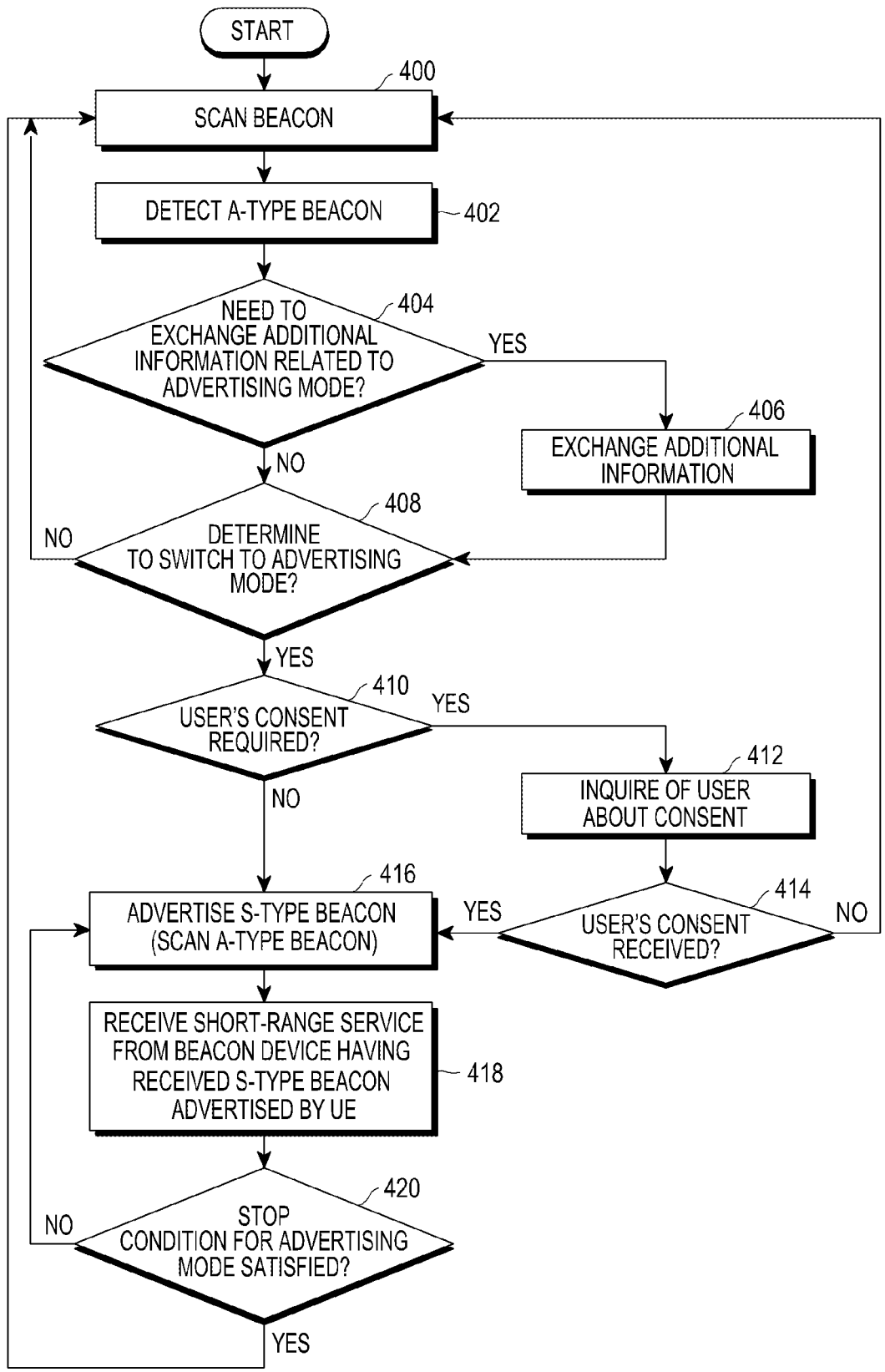
FIG. 4 is an example of a flowchart illustrating operations of a user equipment (UE) according to an embodiment of the present disclosure.

FIG. 4 is an example of a flowchart illustrating operations of a UE according to an embodiment of the present disclosure.

Referring to FIG. 4, in operation 400, a UE operating in the scanning mode is assumed to scan a beacon signal and to move near an A-type beacon device. In operation 402, the UE is assumed to detect an A-type beacon signal. In this case, the UE may scan a BLE or Wi-Fi-based beacon signal, or an ultrasound-based beacon signal through a microphone, depending on a transmission scheme of the A-type beacon device. For example, it is assumed that if the A-type beacon device transmits the ultrasound-based beacon signal and the UE switches to the advertising mode, the BLE-based beacon signal is transmitted. Then the UE having detected the A-type beacon signal transmitted based on ultrasound turns on the Bluetooth function therein. In operation 404, the UE determines whether information indicating whether to receive additional information related to the advertising mode through the server is included in the detected A-type beacon signal. Herein, the detected A-type beacon signal may include the beacon service-related information and the advertising mode-related information described with reference to FIG. 3.

If the information indicating whether to receive the additional information related to the advertising mode through the server indicates reception of the additional information, the UE goes to operation 406. In operation 406, the UE exchanges the additional information that may be referred to during switch to the advertising mode with the A-type beacon device or the server. In this case, the additional information that may be referred to during switch to the advertising mode may include the advertising period, the advertising signal strength, the information to be included in a beacon signal to be advertised, whether to perform scanning simultaneously with advertisement, and so forth. The exchange of the additional information between the UE and the beacon device may be performed based on at least one of a scheme of requesting the additional information without setting up connection between the UE and the beacon device or a scheme for requesting the additional information by setting up the connection.

If the information indicating whether to receive the additional information related to the advertising mode through the server does not indicate reception of the additional information, the UE goes to operation 408. In operation 408, the UE determines whether to switch to the advertising mode. More specifically, to determine whether to switch to the advertising mode, the UE according to an embodiment of the present disclosure determines whether at least one of switch conditions to the advertising mode is satisfied as below.

Switch Conditions to Advertising Mode 1. in case that a strength of a detected A-type beacon signal is greater than or equal to a predetermined threshold;

2. in case that received A-type beacon signals are matched to a specific signal pattern, for example, A-type beacon signals are received m or more times for n seconds or the strength of a received A-type beacon signal is increasing; and 3. in case that a particular code or pattern indicating switch to the advertising mode is included in the advertising mode-related information included in a received A-type beacon signal.

If any one of the foregoing switch conditions to the advertising mode is not satisfied in operation 408, the UE returns to operation 400 to maintain the scanning mode to operate according to the general forward beacon scheme. The general forward beacon scheme may operate, for example, as illustrated in FIG. 1.

If determining that at least one of the switch conditions to the advertising mode is satisfied in operation 408, the UE inquires of the server about whether user's consent is required if a service corresponding to the detected A-type beacon signal is provided, before switching to the advertising mode in operation 410. If the service to be provided is limited to a place in which or a service type for which user's consent is set in advance, or no need to inquire user's consent is set in user's switch to the advertising mode, the UE goes to operation 416 without separately performing operation 410.

However, in operation 410, if the service corresponding to the detected A-type beacon signal does not get prior consent from the user, the UE inquires of the server about whether separate user's consent is required. If the user's consent is required, the UE inquires of the user about consent to the service to the server in operation 412. Depending on an embodiment, the UE may bring up a popup window for allowing the user to directly input user's consent onto a screen. If the UE fails to receive the user's consent to the service in operation 414, the UE returns to operation 400 without switching to the advertising mode and maintains the forward beacon scheme.

If the UE receives the user's consent in operation 414, the UE switches to the advertising mode to periodically advertise an S-type beacon signal in operation 416. In this case, information such as content, period, and transmission strength of a beacon signal to be transmitted may use a preset default value or may be determined by the additional information obtained during the exchange of the additional information with the beacon device or the server in operation 406. Whether the UE operating in the advertising mode scans the A-type beacon at the same time may also be determined according to preset settings or settings obtained from the additional information, and by the information exchanged during the exchange of the additional information with the beacon device.

It is assumed that an S-type beacon device that receives a beacon signal exists near a UE in the advertising mode which periodically transmits an S-type beacon signal, and the S-type beacon device receives the S-type beacon signal transmitted by the UE. In this case, in operation 418, the UE is provided with a short-range service associated with the S-type beacon device. According to an embodiment, if the UE is configured to perform a scanning-mode operation in the advertising mode, the UE may be provided with an A-type beacon service and an S-type beacon service at the same time. The short-range service may include a tailored advertisement, a coupon, indoor navigation, and so forth. The short-range service provided to the UE in this case may be directly provided through the UE or may be provided through a $3^{rd}$-party server.

In operation 420, the UE operating in the advertising mode determines whether a stop condition for the advertising mode according to an embodiment of the present disclosure is satisfied. If the stop condition for the advertising mode is not satisfied, the UE continues periodically transmitting the S-type beacon signal in operation 416. If the stop condition for the advertising mode is satisfied, the UE stops transmitting the S-type beacon signal and returns to operation 400 to switch to the scanning mode for receiving the A-type beacon signal. The stop condition according to an embodiment of the present disclosure is satisfying at least one of the following conditions:

Stop Conditions for Advertising Mode

1. In case that the S-type beacon signal transmitted by the UE is not detected by any beacon device for a specific time or longer. That is, if the server does not receive a notification of detection of the S-type beacon signal from any beacon device, the server transmits a request or instruction for stopping advertisement of the A-type beacon signal to the UE satisfying the condition 1.

2. In case that the beacon signal including information for directly/indirectly maintaining the advertising mode of the UE is not detected for a predetermined time. Herein, the information for directly maintaining the advertising mode corresponds to an instruction/command for switching to the advertising mode. The information for indirectly maintaining the advertising mode corresponds to an S-type beacon signal advertised by another UE for a similar service near the user.

3. In case that the UE detects the beacon signal including information indicating switch from the advertising mode to the scanning mode.

4. In case that a beacon signal including information instructing the UE to switch to the advertising mode is detected when the UE moves out of a designated position.

Figure 5:
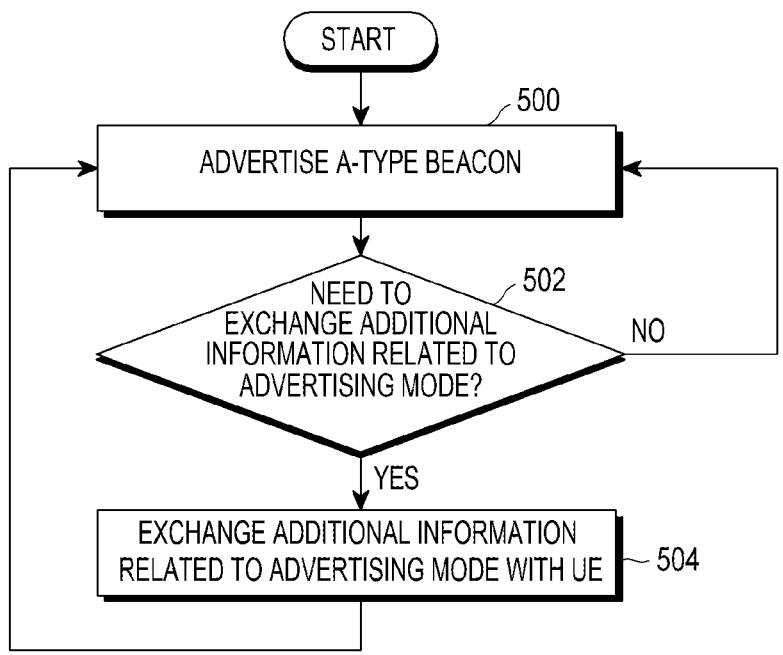
FIG. 5 is an example of a flowchart illustrating operations of an A-type beacon device according to an embodiment of the present disclosure.

FIG. 5 is an example of a flowchart illustrating operations of an A-type beacon device according to an embodiment of the present disclosure.

Referring to FIG. 5, an A-type beacon device according to an embodiment of the present disclosure periodically transmits an A-type beacon signal in operation 500. Herein, the A-type beacon signal may include at least one of the beacon service-related information and the advertising mode-related information described with reference to FIG. 3. If the A-type beacon device includes information indicating reception of additional information related to the advertising mode in the advertised A-type beacon signal in operation 502, the A-type beacon device exchanges additional information for switch to the advertising mode with a UE having received the A-type beacon device in operation 504. In this case, the exchanged additional information may include the parameters needed for switch of the UE to the advertising mode, the information indicating a technology to be used in the advertising mode, and so forth. During the exchange, the A-type beacon device may advertise the A-type beacon signal in predetermined periods according to an embodiment.

If the A-type beacon device includes information not indicating reception of the additional information in operation 502, the A-type beacon device returns to operation 500 to continue advertising the A-type beacon signal.

Figure 6:
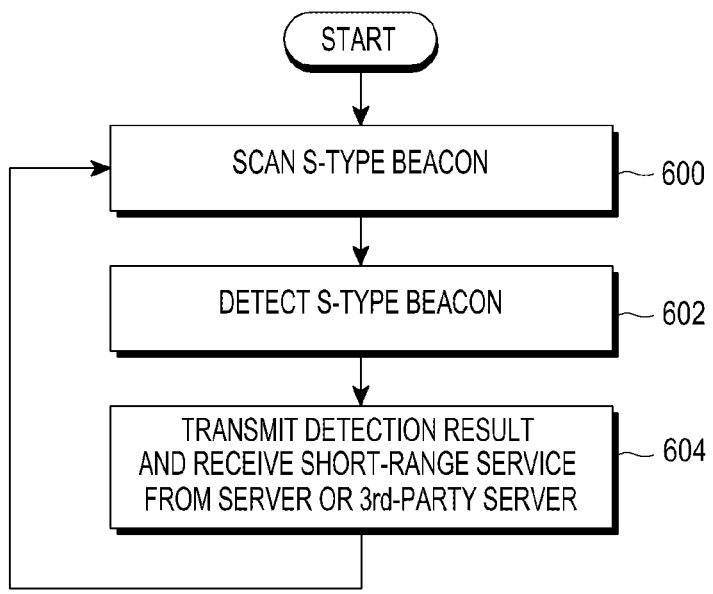
FIG. 6 is an example of a flowchart illustrating operations of an S-type beacon device according to an embodiment of the present disclosure.

FIG. 6 is an example of a flowchart illustrating operations of an S-type beacon device according to an embodiment of the present disclosure.

Referring to FIG. 6, an S-type beacon device according to an embodiment of the present disclosure performs a scanning operation for receiving an S-type beacon signal transmitted by the UE in operation 600. Suppose the S-type beacon device has detected the S-type beacon signal transmitted from the UE during the scanning operation in operation 602. Then in operation 604, the S-type beacon device transmits a result of detecting the S-type beacon signal to a server or a $3^{rd}$-party server. The server or the $3^{rd}$-party server having received the detection result provides a service corresponding to the detection result to the UE. Herein, the S-type beacon signal detected by the S-type beacon device may include location information of the UE having transmitted the S-type beacon signal. For example, the location information may include detailed location information indicating a distance between the UE and the S-type beacon device with respect to a location of the S-type beacon device by using a predetermined unit, such as enter periphery/proximate/super proximate/tag/leave super-proximity/leave proximity/leave periphery, etc. Thus, the UE may receive a service corresponding to the detection result from the server or the $3^{rd}$-party server having received the detection result.

Figure 7:
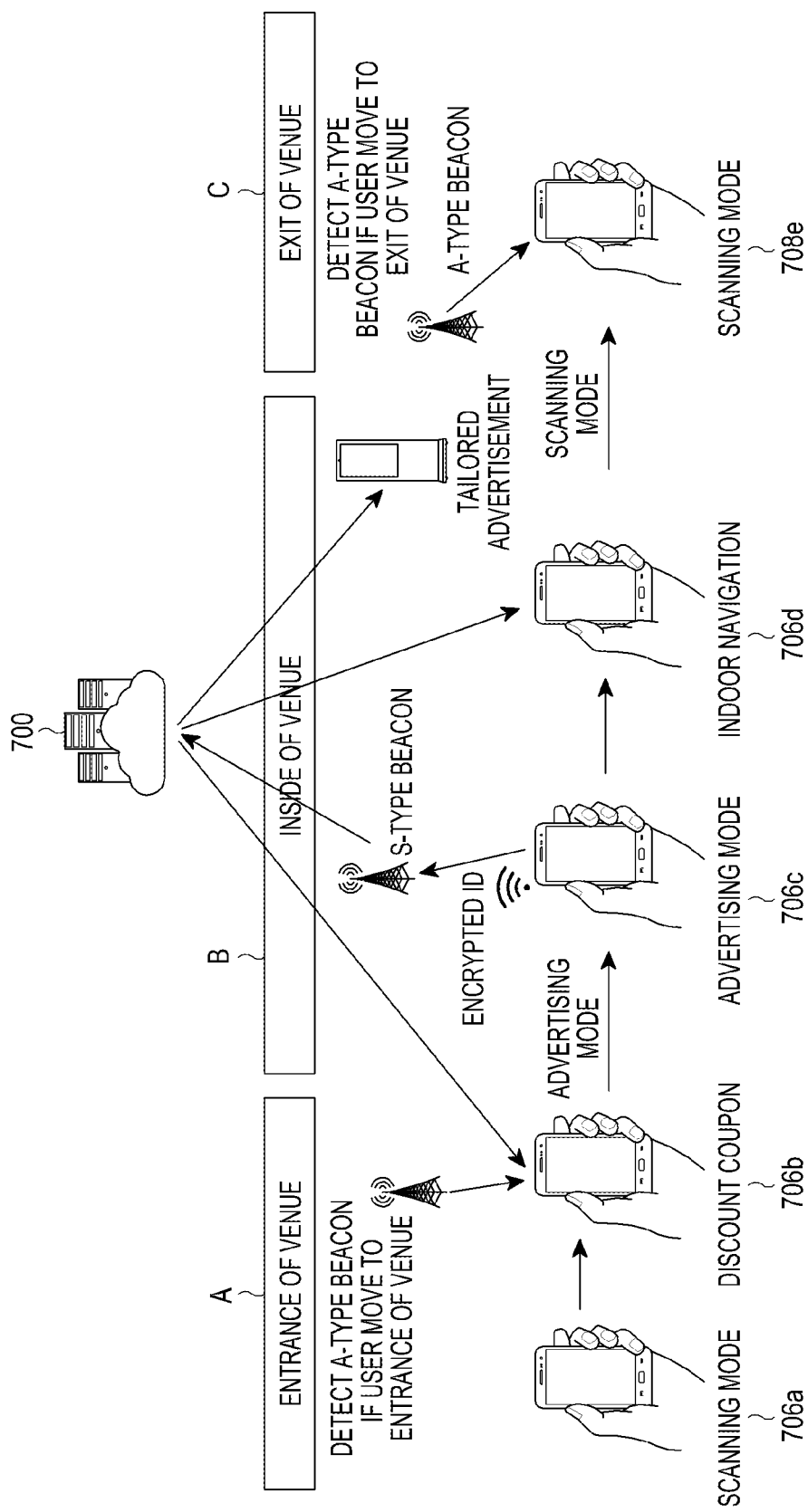
FIG. 7 shows an embodiment where a UE according to an embodiment of the present disclosure is provided with a short-range service to which a hybrid beacon scheme is applied, as the UE moves.

FIG. 7 shows an embodiment where a UE according to an embodiment of the present disclosure is provided with a short-range service to which a hybrid beacon scheme is applied, as the UE moves.

Referring to FIG. 7, suppose A-type beacon devices are installed in an entrance A and an exit C of a venue, and an S-type beacon device is installed in an inside B of the venue. In this case, if the user holding a UE operating in the scanning mode as indicated by 706*a* approaches the entrance A of the venue, the UE receives an A-type beacon signal broadcast from the A-type beacon device installed in the entrance A as indicated by 706*b*. Herein, the A-type beacon signal may include the beacon service-related information and the advertising mode-related information according to an embodiment of the present disclosure. Then, the UE having received the A-type beacon signal connects to a server 700 and receives the beacon service-related information obtained from the detected A-type beacon signal. In this case, the beacon service-related information may include a discount coupon available in the venue, a sales list of products for sale, and etc. The UE may determine whether to switch to the advertising mode based on the advertising mode-related information included in the A-type beacon signal. The UE may also configure parameters related to the advertising mode depending on a type of a service to be provided in the inside B of the venue. Such parameters may include information to be included in an advertisement, an advertising period, an advertising signal strength, information indicating whether to perform scanning simultaneously with advertisement, etc. The parameters may be configured with parameters obtained from the A-type beacon signal or may be obtained by information exchange with the server 700. More specifically, if the service to be provided in the inside B of the venue is a service in which a speed of reaction of the user is important, the UE may set a rapid advertising period. If the service is a service that is not related to the user's reaction speed, the UE may set a slow advertising period to reduce electric current consumption of the UE. The service in which a speed of reaction of the user is important may include a service provided to a user in the order of arrival at the inside B of the venue, indoor navigation, a tailored advertisement, and so forth. The service in which the speed of reaction of the user is not important may include a menu and a detailed schedule which are set by default in the inside B of the venue and thus are not changed.

In the inside B of the venue, the user may be provided with a service by merely holding the UE, and the service may be provided by using, in a hybrid manner, information provided when the UE notifies the server of detection of the A-type beacon signal. Suppose the UE switches to the advertising mode as indicated by 706*c* to transmit the S-type beacon signal and the S-type beacon device installed in the inside B of the venue notifies the server 700 of reception of the S-type beacon signal. In this case, the UE may advertise the S-type beacon signal after including location information indicating that the user enters the venue through a VIP reversed parking space in the S-type beacon signal. Then, the S-type beacon device delivers the location information while notifying the server of reception of the S-type beacon signal from the UE. In this case, the UE may provide a VIP-only service provided in the inside B of the venue from the server 700. According to another embodiment, as indicated by 706*d*, the UE may use an indoor navigation service guiding indoor location information in the inside B of the venue.

If the user moves out of a service area of the venue through the exit C of the venue, the UE obtains information indicating that the user moves out of the service area of the venue by receiving the A-type beacon signal of the A-type beacon device installed in the exit C of the venue as indicated by 708*e*, and in this case, the UE enters the scanning mode.

Figure 8:
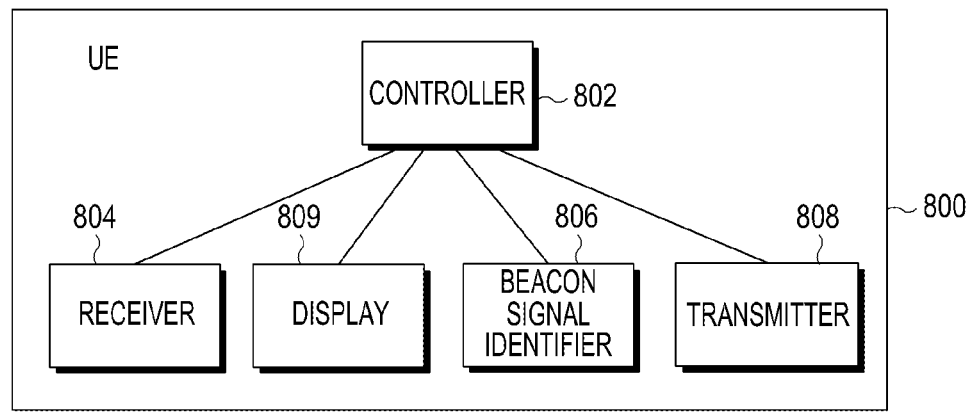
FIG. 8 is a block diagram of a UE according to an embodiment of the present disclosure.

FIG. 8 is a block diagram of a UE according to an embodiment of the present disclosure.

Referring to FIG. 8, for convenience, a UE 800 may include a controller 802, a receiver 804, a beacon signal identifier 806, a transmitter 808, and a display 809. A detailed structure of the UE 800 may be divided, or some units thereof may be integrated according to an embodiment of the present disclosure or depending on an operator's intention. The UE may operate based on the operation flow illustrated in FIG. 4. The controller 802 controls overall operations of respective sub units such that the sub units operate according to the embodiment of FIG. 4. The display 809 displays information obtained from an A-type beacon signal received through the receiver 804 and location-based services of the UE 800 obtained based on the information. If an input of user's consent in switch to the advertising mode is required, the display 809 may display a popup window inquiring the user's consent. The transmitter 808 transmits an S-type beacon signal in the advertising mode under control of the controller 802. The beacon signal identifier 806 obtains beacon service-related information or advertising mode-related information from the A-type beacon signal obtained through the receiver 804.

Figure 9:
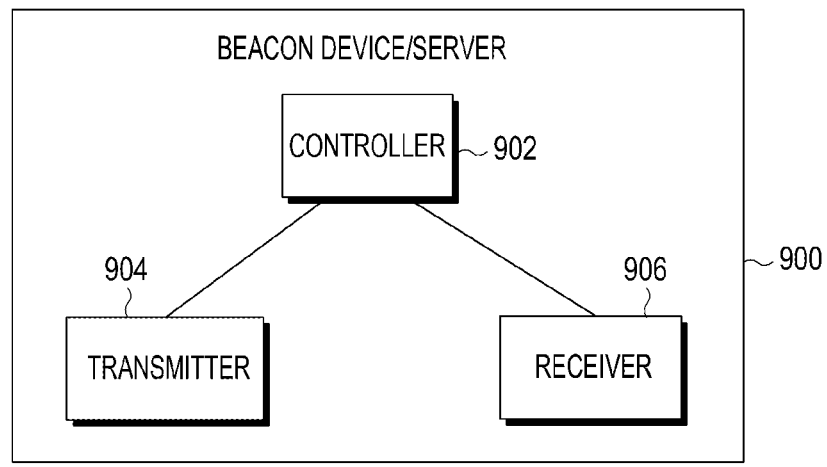
FIG. 9 is a block diagram of a beacon device/server according to an embodiment of the present disclosure.

FIG. 9 is a block diagram of a beacon device or a server according to an embodiment of the present disclosure.

Referring to FIG. 9, a beacon device or server 900 may include a controller 902, a transmitter 904, and a receiver 906. Likewise, a detailed structure of the beacon device or server 900 may be divided or some units thereof may be integrated according to an embodiment of the present disclosure or depending on an operator's intention.

When the beacon device 900 operates, respective elements operate corresponding to the A-type beacon device or the S-type beacon device of FIGS. 5 and 6 and thus will not be described repeatedly.

When the server 900 operates, the server 900 stores location information mapped to each service. Once the controller 902 receives a notification indicating that the UE has detected the A-type beacon signal through the transmitter 904, the controller 902 controls the transmitter 904 to provide a service mapped to location information corresponding to the A-type beacon signal to the UE.

If the advertising mode-related information is included in the A-type beacon signal and the receiver 906 receives a request for additional information related to the advertising mode from the UE, then the controller 902 delivers the additional information to the UE through the transmitter 906. Herein, the additional information has already been described and thus will not be described again.

Meanwhile, if the controller 902 receives a notification indicating detection of an S-type beacon signal transmitted from the UE from an S-type beacon device through the receiver 906, the controller 902 controls the transmitter 904 to provide a service mapped to location information corresponding to the S-type beacon signal to the UE.

The method and apparatus for providing a location-based service using a hybrid beacon technique according to an embodiment of the present disclosure may be implemented by hardware, software, or a combination of hardware and software. Such arbitrary software may be stored, for example, in a volatile or non-volatile storage device (e.g., a read only memory (ROM), etc.), a memory (e.g., a random-access memory (RAM), a memory chip, a memory device, or a memory integrated circuit (IC)), or a machine (e.g., computer) recordable optical or magnetic storage medium (e.g., a compact disk (CD), a digital versatile disk (DVD), a magnetic disc, a magnetic tape, etc.) regardless of its ability to erase or rewrite. It can be seen that the graphic screen update method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine(computer)-readable storage medium for storing such a program. Furthermore, the program may be electronically transferred by an arbitrary medium, such as a communication signal transmitted through a wired or wireless connection, and the present invention appropriately includes equivalents of the program.

Moreover, in an embodiment of the present disclosure, in the communication system, the mobile terminal in the idle mode may receive and store the program from an apparatus for providing and receiving the MT service. The program providing device may include a memory for storing a program including instructions for instructing a graphic processing device to execute a preset method, information necessary for the method, a communication unit for performing wired or wireless communication with the graphic processing device, and a controller for transmitting a corresponding program to the graphic processing device at the request of the graphic processing device or automatically.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method of a user equipment (UE) for a location-based service, the method comprising:
   scanning at least one beacon signal related to a location of the location-based service in a first mode for scanning the at least one beacon signal;
   detecting, in the first mode, a first beacon signal including first information, the first beacon signal being advertised by an external device;
   identifying whether to switch from the first mode to a second mode for advertising a second beacon signal based on at least one of a strength and a pattern of the first beacon signal satisfying a specified condition for switching;
   identifying whether user consent is required for the second mode based on a service type indicated by the first information included in the first beacon signal;
   prompting for the user consent based on the user consent being required;
   switching from the first mode to the second mode based on the user consent being received; and
   advertising, in the second mode, the second beacon signal including second information related to the UE, based on the first information,
   wherein the first information includes information related to a communication scheme for advertising the second beacon signal,
   wherein the communication scheme is one from among a plurality of communication schemes supported by the UE, and
   wherein the advertising the second beacon signal includes advertising the second beacon signal using the communication scheme.

2. The method of claim 1, wherein the switching from the first mode to the second mode comprises identifying whether at least one of a plurality of conditions is satisfied, the plurality of conditions comprising the strength of the first beacon signal being greater than or equal to a threshold, the pattern of the first beacon signal matching a predetermined pattern, and the first beacon signal comprising information indicating the second mode.

3. The method of claim 1, wherein the advertising the second beacon signal comprises concurrently scanning the first beacon signal and advertising the second beacon signal based on the first information included in the first beacon signal, in the second mode.

4. The method of claim 1, further comprising identifying whether to switch from the second mode to the first mode based on at least one of a plurality of conditions being satisfied while operating in the second mode, the plurality of conditions comprising non-detection of the second beacon signal for a threshold time, information for maintaining the second mode not being received for the threshold time, and an indication to switch from the second mode to the first mode being received.

5. A user equipment (UE) for receiving a location-based service, the UE comprising:

a transceiver; and
a controller configured to:
scan, using the transceiver, at least one beacon signal related to a location of the location-based service in a first mode for scanning the at least one beacon signal;
detect, in the first mode, a first beacon signal including first information, the first beacon signal being advertised by an external device;
identify whether to switch from the first mode to a second mode for advertising a second beacon signal based on at least one of a strength and a pattern of the first beacon signal satisfying a specified condition for switching;
identify whether user consent is required for the second mode based on a service type indicated by the first information included in the first beacon signal;
prompt for the user consent based on the user consent being required;
switch from the first mode to the second mode based on the user consent being received; and
advertise, using the transceiver, the second beacon signal including second information related to the UE based on the first information, in the second mode,
wherein the first information includes information related to a communication scheme for advertising the second beacon signal,
wherein the communication scheme is one from among a plurality of communication schemes supported by the UE, and
wherein the controller is further configured to advertise the second beacon signal using the communication scheme.

6. The UE of claim 5, wherein the controller is further configured to identify whether to switch from the first mode to the second mode based on at least one of a plurality of conditions being satisfied, the plurality of conditions comprising the strength of the first beacon signal being greater than or equal to a threshold, the pattern of the first beacon signal matching a predetermined pattern, and the first beacon signal comprising information indicating the second mode.

7. The UE of claim 5, wherein the controller is configured to concurrently scan the first beacon signal and advertise the second beacon signal based on the first information included in the first beacon signal, in the second mode.

8. The UE of claim 5, wherein the controller is further configured to switch from the second mode to the first mode based on at least one of a plurality of conditions being satisfied while operating in the second mode, the plurality of conditions comprising non-detection of the second beacon signal for a threshold time, information for maintaining the second mode not being received for the threshold time, and an indication to switch from the second mode to the first mode being received.

9. The UE of claim 5, wherein the controller is further configured to identify a communication protocol, based on the first information included in the first beacon signal, as one from among Bluetooth, Wireless Fidelity (Wi-Fi) and sound.

10. A user equipment (UE) for receiving a location-based service, the UE comprising:
a transceiver; and
a controller configured to:
scan, using the transceiver, a first beacon signal related to a location of the location-based service in a first mode for scanning the first beacon signal, wherein the first beacon signal is advertised by an external device;
switch from the first mode to a second mode for advertising a second beacon signal including second information related to the UE based on first information included in the first beacon signal; and
advertise, using the transceiver, the second beacon signal including the second information related to the UE,
wherein the controller is further configured to advertise, in the second mode, the second beacon signal using a communication protocol indicated in the first information included in the first beacon signal, and
wherein the controller is further configured to advertise, in the second mode, the second beacon signal at a transmission period indicated in the first information included in the first beacon signal.

11. The UE of claim 5, wherein the controller is further configured to:
control the transceiver to report to a server that the UE has detected the first beacon signal;
control the transceiver to receive parameters for the second mode from the server;
identify, based on the parameters for the second mode received from the server, whether the user consent is required for the second mode;
based on the user consent being required for the second mode, prompt for the user consent; and
based on the user consent being received, switch from the first mode to the second mode.

12. The UE of claim 5, wherein the controller is further configured to advertise, in the second mode, the second beacon signal at a transmission period indicated in the first information included in the first beacon signal.

* * * * *